(12) United States Patent
Sellnau et al.

(10) Patent No.: US 11,060,497 B2
(45) Date of Patent: Jul. 13, 2021

(54) COLD START STRATEGY AND SYSTEM FOR GASOLINE DIRECT INJECTION COMPRESSION IGNITION ENGINE

(71) Applicant: DELPHI TECHNOLOGIES IP LIMITED, St. Michael (BB)

(72) Inventors: Mark C. Sellnau, Bloomfield Hills, MI (US); Gregory T. Roth, Davison, MI (US)

(73) Assignee: DELPHI TECHNOLOGIES IP LIMITED

( * ) Notice: Subject to any disclaimer, the term of this patent is extended or adjusted under 35 U.S.C. 154(b) by 533 days.

(21) Appl. No.: 15/902,050

(22) Filed: Feb. 22, 2018

(65) Prior Publication Data

US 2018/0180013 A1 Jun. 28, 2018

Related U.S. Application Data

(62) Division of application No. 14/068,278, filed on Oct. 31, 2013, now abandoned.

(51) Int. Cl.
*F02N 19/04* (2010.01)
*F02N 19/00* (2010.01)
(Continued)

(52) U.S. Cl.
CPC .............. *F02N 19/04* (2013.01); *F01L 13/08* (2013.01); *F02B 29/0412* (2013.01);
(Continued)

(58) Field of Classification Search
CPC ... F01L 13/08; F02B 29/0412; F02B 29/0418; F02B 29/0443; F02B 37/04; F02B 39/04;
(Continued)

(56) References Cited

U.S. PATENT DOCUMENTS 3,795,231 A    3/1974  Brille
4,463,721 A *  8/1984  Hayashi ................... F02D 9/02
                                                      123/378

(Continued)

FOREIGN PATENT DOCUMENTS

CN        1305052 A        7/2001
JP        H09151771 A      6/1997
WO        WO2012058280  *  5/2012

OTHER PUBLICATIONS

170215 NASA Isentropic Compression or Expansion.PDF.
(Continued)

*Primary Examiner* — Carl C Staubach
(74) *Attorney, Agent, or Firm* — Joshua M. Haines

(57) ABSTRACT

A method for starting a compression ignition engine having at least one cylinder with a reciprocating piston located therein, an intake valve configured to control the intake of air to an intake port of the cylinder and an exhaust valve configured to control the expulsion of gas from an exhaust port of the cylinder. The method includes the steps of: cranking the engine, conditioning intake air at the intake port of the cylinder to raise the temperature of air in the cylinder, controlling a valve timing the intake valve and/or the exhaust valve to allow the piston to compress the air within the cylinder, thereby increasing the temperature of the air within the cylinder, and injecting fuel into the cylinder when the air within the cylinder has been heated to a temperature sufficient to support compression ignition of a gasoline and air mixture within the cylinder.

19 Claims, 3 Drawing Sheets

(51) Int. Cl.

| | | |
|---|---|---|
| *F02D 41/06* | (2006.01) | |
| *F02D 41/30* | (2006.01) | |
| *F02B 29/04* | (2006.01) | |
| *F02M 31/13* | (2006.01) | |
| *F02D 15/00* | (2006.01) | |
| *F02D 23/00* | (2006.01) | |
| *F02D 41/00* | (2006.01) | |
| *F02D 13/02* | (2006.01) | |
| *F01L 13/08* | (2006.01) | |
| *F02M 26/28* | (2016.01) | |
| *F02D 41/18* | (2006.01) | |
| *F02B 3/06* | (2006.01) | |
| *F02B 37/04* | (2006.01) | |
| *F02B 39/04* | (2006.01) | |
| *F02B 39/12* | (2006.01) | |
| *F02D 9/04* | (2006.01) | |
| *F02M 26/08* | (2016.01) | |

(52) U.S. Cl.
CPC ...... *F02B 29/0418* (2013.01); *F02B 29/0443* (2013.01); *F02D 13/0219* (2013.01); *F02D 15/00* (2013.01); *F02D 23/00* (2013.01); *F02D 41/0007* (2013.01); *F02D 41/064* (2013.01); *F02D 41/3035* (2013.01); *F02M 26/28* (2016.02); *F02M 31/13* (2013.01); *F02N 19/004* (2013.01); *F02B 3/06* (2013.01); *F02B 37/04* (2013.01); *F02B 39/04* (2013.01); *F02B 39/12* (2013.01); *F02D 9/04* (2013.01); *F02D 41/18* (2013.01); *F02D 2200/101* (2013.01); *F02D 2700/035* (2013.01); *F02M 26/08* (2016.02); *F02N 2200/023* (2013.01); *Y02T 10/12* (2013.01); *Y02T 10/40* (2013.01)

(58) Field of Classification Search
CPC ........ F02B 39/12; F02B 3/06; F02D 13/0219; F02D 15/00; F02D 2200/101; F02D 23/00; F02D 2700/035; F02D 41/0007; F02D 41/064; F02D 41/18; F02D 41/3035; F02D 9/04; F02M 26/08; F02M 26/28; F02M 31/13; F02N 19/004; F02N 2200/023; Y02T 10/126; Y02T 10/144; Y02T 10/146; Y02T 10/18; Y02T 10/42

See application file for complete search history.

(56) References Cited

U.S. PATENT DOCUMENTS

| | | | |
|---|---|---|---|
| 4,518,268 | A | 5/1985 | Swis et al. |
| 4,730,593 | A | 3/1988 | Regar |
| 5,440,880 | A | 8/1995 | Ceynow et al. |
| 5,482,013 | A | 1/1996 | Andrews et al. |
| 5,715,777 | A | 2/1998 | Wada et al. |
| 5,823,170 | A | 10/1998 | Sienicki |
| 5,890,468 | A | 4/1999 | Ozawa |
| 5,992,399 | A | 11/1999 | Anderson et al. |
| 6,131,553 | A | 10/2000 | Suzuki |
| 6,230,683 | B1 | 5/2001 | zur Loye et al. |
| 6,276,334 | B1 * | 8/2001 | Flynn .................... F02B 19/14 123/435 |
| 6,349,708 | B1 | 2/2002 | Horlacher et al. |
| 6,666,194 | B2 | 12/2003 | Wildner |
| 6,971,365 | B1 | 12/2005 | Najt et al. |
| 7,079,935 | B2 | 7/2006 | Lewis et al. |
| 2002/0056444 | A1 | 5/2002 | Chou et al. |
| 2002/0129604 | A1 | 9/2002 | Wildner |
| 2003/0183185 | A1 | 10/2003 | Sun et al. |
| 2005/0016486 | A1 | 1/2005 | Hayman |
| 2006/0016422 | A1 | 1/2006 | Kuo et al. |
| 2006/0272608 | A1 | 12/2006 | Hara et al. |
| 2007/0062178 | A1 | 3/2007 | Yang |
| 2007/0107692 | A1 | 5/2007 | Kuo et al. |
| 2009/0259388 | A1 | 10/2009 | Vetrovec |
| 2010/0186725 | A1 | 7/2010 | Barker |
| 2011/0168688 | A1 | 7/2011 | Rankin et al. |
| 2011/0203258 | A1 | 8/2011 | Makartchouk et al. |
| 2011/0320104 | A1 | 12/2011 | Sellnau et al. |
| 2012/0222639 | A1 | 9/2012 | Knauf et al. |
| 2013/0213349 | A1 | 8/2013 | Sellnau et al. |
| 2013/0298554 | A1 | 11/2013 | Sellnau |
| 2015/0114339 | A1 | 4/2015 | Sellnau et al. |
| 2015/0152817 | A1 | 6/2015 | Roth et al. |
| 2016/0053714 | A1 | 2/2016 | Sellnau |
| 2016/0153407 | A1 * | 6/2016 | Ursic .................... F02M 31/13 123/556 |

OTHER PUBLICATIONS

Harisankar Bendu, S. Murugan, Homogeneous charge compression ignition (HCCI) combustion; Mixture preparation and control strategies in diesel engines, Department of Mechanical Engineering, National Institute of Technology Rourkela, India Received Sep. 26, 2013, Revised May 7, 2014, Accepted Jul. 6, 2014, Available online Jul. 24, 2014.

\* cited by examiner

COLD START STRATEGY AND SYSTEM FOR GASOLINE DIRECT INJECTION COMPRESSION IGNITION ENGINE

CROSS-REFERENCE TO RELATED APPLICATIONS

This application is a divisional application of U.S. patent application Ser. No. 14/068,278 filed on Oct. 31, 2013, the entire disclosure of which is hereby incorporated herein by reference in its entirety.

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

Gasoline Direct-injection Compression-Ignition (GDCI) is an engine operating mode that shows promise in improving engine emissions performance and efficiency. GDCI provides low-temperature combustion for high efficiency, low NOx, and low particulate emissions over the complete engine operating range. Low-temperature combustion of gasoline may be achieved using multiple late injection (MLI), intake boost, and moderate EGR. GDCI engine operation is described in detail in U.S. Patent Application Publication 2013/0213349A1, the entire contents of which are hereby incorporated herein by reference.

The autoignition properties of gasoline fuels require higher in-cylinder pressure and temperature compared to diesel fuel to achieve compression ignition. This is especially a concern when cold starting an engine.

As a result of the autoignition properties of gasoline fuels, improvements in the ability to cold start a GDCI engine are desired.

BRIEF SUMMARY OF THE INVENTION

In a first aspect of the invention, a method for starting a GDCI engine is provided. The method includes cranking the engine, conditioning intake air provided at the intake port of an engine cylinder to raise the temperature and/or pressure of air in the cylinder, and controlling valve timing to allow compression of air in the cylinder to additionally increase the temperature and/or pressure in the cylinder. When in-cylinder conditions are sufficient to support compression ignition of a gasoline and air mixture within the cylinder, fueling of that cylinder is commenced.

In a second aspect of the invention, a system for starting a GDCI engine is provided. The system includes means for cranking the engine, means for increasing the temperature and/or pressure of intake air provided at the intake port of an engine cylinder, means for controlling the timing of opening and closing of engine intake and exhaust valves, and means for injecting fuel into the cylinder. The system also includes a controller configured to enable engine control hardware to perform the method steps according to the first aspect of the invention.

DETAILED DESCRIPTION OF THE INVENTION

As used herein, the term "cold start" refers to starting the engine when the temperature of the components of the engine and the fluids within the engine are below their respective temperatures when the engine has been operating long enough to reach thermal equilibrium at temperatures above ambient temperature. A "cold start event" refers to the act of performing a cold start of the engine, including the time when an engine start is predicted but before the actual initiation of engine cranking, the time when the engine is cranked, and the transition to a running state where the cranking means is disengaged and the engine rotational speed remains above a minimum threshold.

Figure 1:
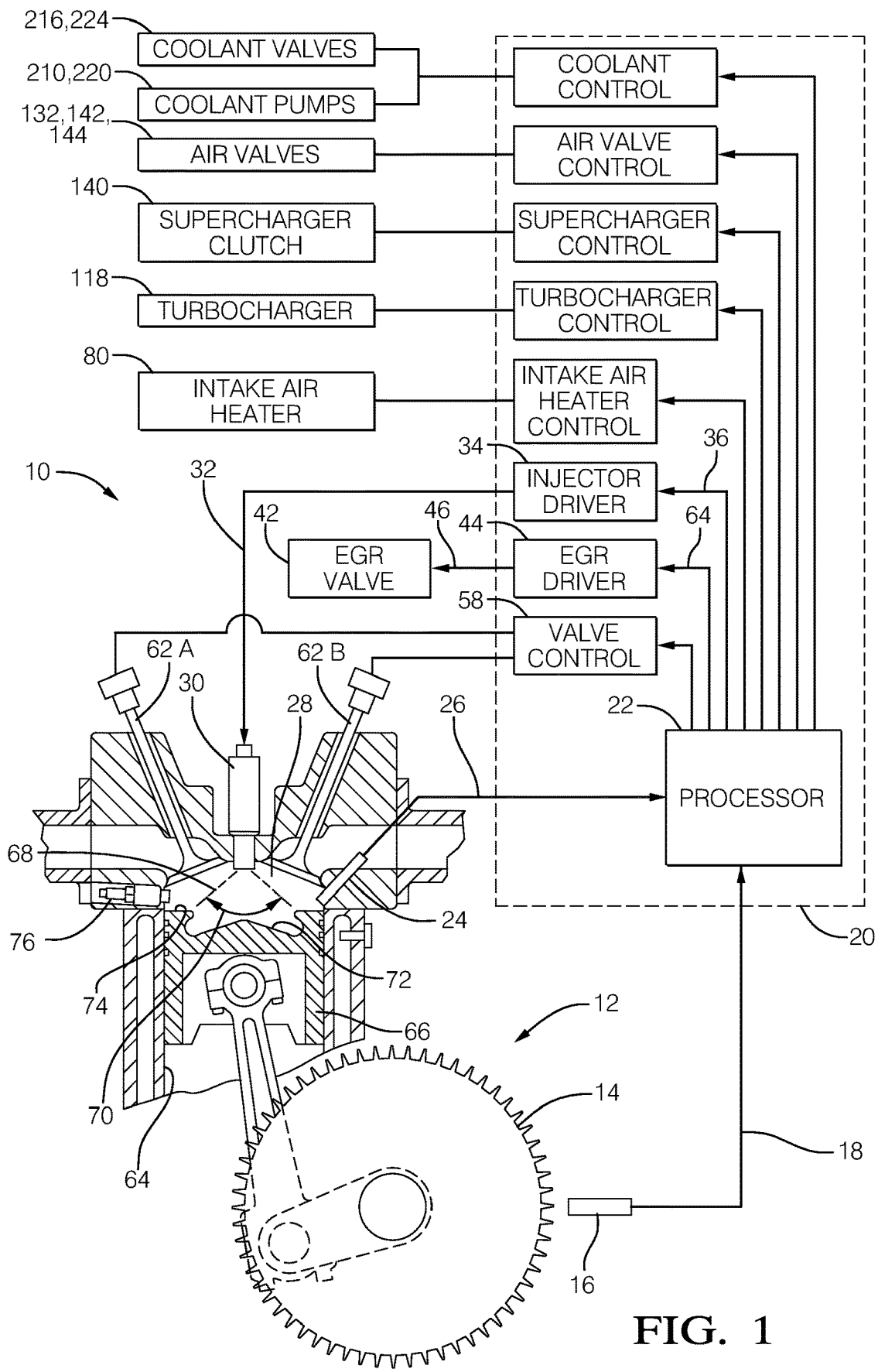
FIG. 1 is a schematic view of an embodiment of an engine control system suitable for controlling a GDCI engine.

FIG. 1 illustrates a non-limiting embodiment of an engine control system 10 suitable for controlling the cold start of a GDCI internal combustion engine 12. The engine 12 is illustrated as having a single cylinder bore 64 containing a piston 66, wherein the region above the piston 66 defines a combustion chamber 28; however it will be appreciated that the system 10 may be adapted to engines having multiple cylinders and combustion chambers. The engine control system 10 may control an engine having multiple combustion chambers by individually controlling each of the multiple combustion chambers, or may control such an engine based on a signal from a sensor that is representative of a typical or average condition in each combustion chamber. The system 10 may include a toothed crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior engine control parameter and scheduling a future engine control signal such that a future engine control parameter corresponds to a desired engine control parameter. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion sensing means 24 configured to output a combustion signal 26 indicative of a combustion characteristic of a combustion event occurring within the combustion chamber 28. One way to monitor the progress of a combustion event is to determine a heat release rate or cumulative heat release for the combustion event. However, because of the number and complexity of measurements, determining heat release may not be suitable for controlling engines during field use such as when engines are operated in vehicles traveling in uncontrolled environments like public roadways. A combustion detection means suitable for field use may provide an indication of a combustion characteristic that can be correlated to laboratory type measurements such as heat release. Exemplary combustion detection means 24 include, but are not limited to, an ionization sensor configured to sense the ionization level of the combustion products in the combustion chamber 28 or a pressure sensor configured to sense the pressure within the combustion chamber 28. Another device that may be useful for indicating some aspect of the combustion process is a combustion knock sensor. The combustion detection means 24 may be any one of the exemplary sensors, or a combination of two or more sensors arranged to provide an indication of a combustion characteristic.

The engine control system 10 includes one or more engine control devices operable to control an engine control parameter in response to an engine control signal, wherein the engine control parameter influences when autoignition occurs. One example of an engine control device is a fuel injector 30 adapted to dispense fuel 68 in accordance with an injector control signal 32 output by an injector driver 34 in response to an injection signal 36 output by the processor 22. The fuel injection profile may include a plurality of injection events. Controllable aspects of the fuel injection profile may include how quickly or slowly the fuel injector 30 is turned on and/or turned off, a fuel rate of fuel 68 dispensed by the fuel injector 30 while the fuel injector 30 is on, or the number of fuel injections dispensed to achieve a combustion event. Varying one or more of these aspects of the fuel injections profile may be effective to control autoignition.

The exemplary engine control system 10 includes an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen and/or nitrogen in the air mixture received into the combustion chamber 28. The controller 20 may include an EGR driver 44 that outputs an EGR control signal 46 to control the position of the EGR valve 42. The EGR driver may, for example, pulse width modulate a voltage to generate an EGR control signal 46 effective to control the EGR valve to regulate the flow rate of exhaust gases received by the engine 12.

Referring again to FIG. 1, the engine control system 10 may include other engine management devices. For example the engine control system 10 may include a turbocharger 118. The turbocharger 118 receives a turbocharger control signal from a turbocharger control block that may control a boost pressure by controlling the position of a waste gate or bypass valve, or controlling a vane position in a variable geometry turbocharger. The engine control system 10 may also include a supercharger driven by the engine through a supercharger clutch 140, the supercharger clutch 140 being controlled by a supercharger control block in the controller 20. The engine control system 10 may also include a valve control block 58 that may directly control the actuation of engine intake valve 62A and exhaust valve 62B, or may control the phase of a cam (not shown) actuating the intake valve 62A and/or the exhaust valve 62B.

Still with reference to FIG. 1, the engine control system 10 may include one or more intake air heaters 80 configured to heat air at the intake manifold or intake port of each cylinder. Each intake air heater 80 is controllable by a control signal received from an intake air heater control block in a manner to be discussed in further detail below.

Although not specifically indicated in FIG. 1, the engine control system 10 may include additional sensors to measure temperature and/or pressure at locations within the air intake system and/or the engine exhaust system.

Figure 2:
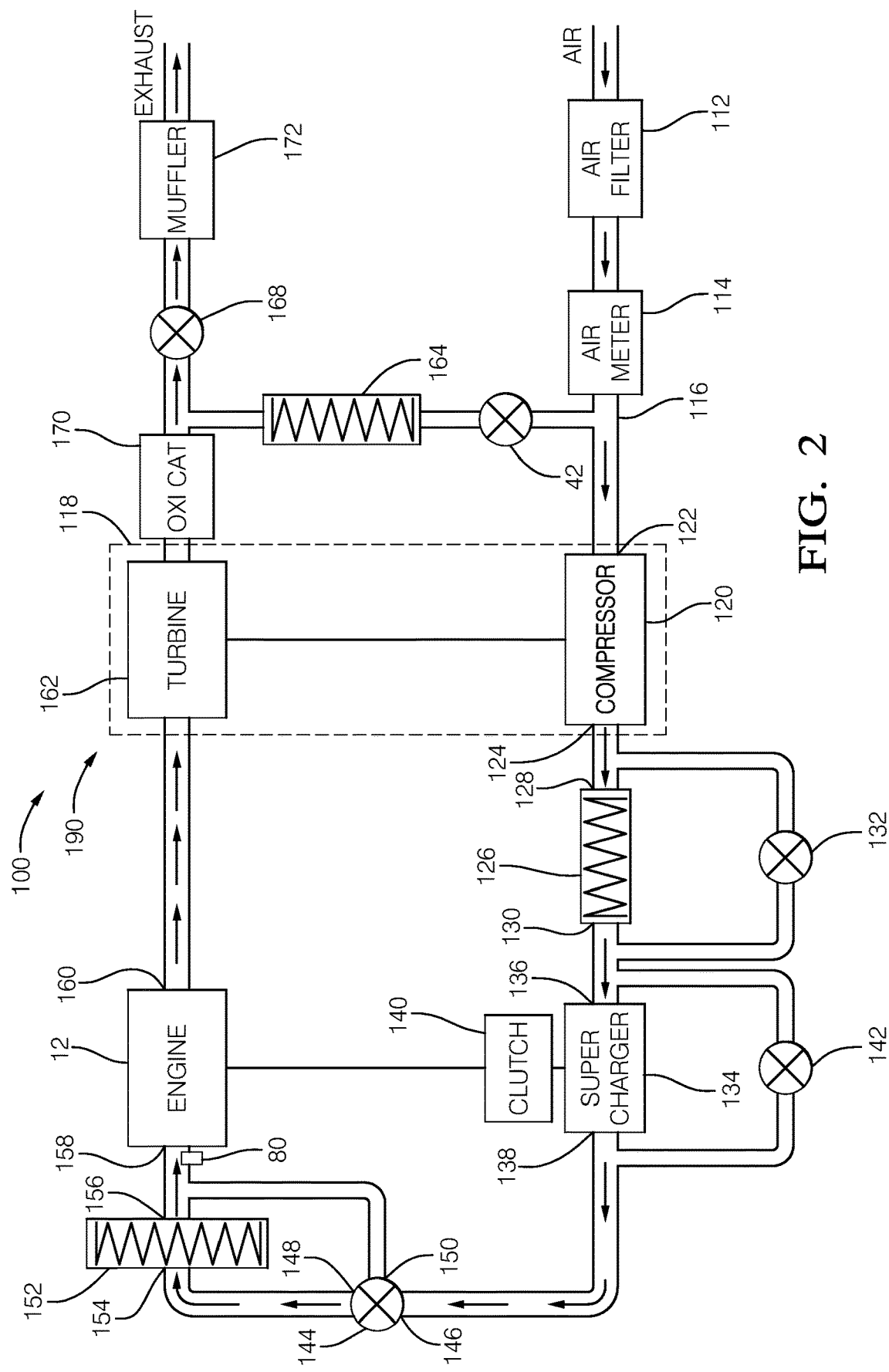
FIG. 2 is a block diagram of an embodiment of the gas (air and/or exhaust) paths of an engine system.

FIG. 2 is a block diagram of a non-limiting embodiment of the gas paths 190 of a GDCI system usable with the engine 12 of FIG. 1. This diagram depicts the routing and conditioning of gases (e.g. air and exhaust gas) in the system. Referring to FIG. 2, air passes through an air filter 112 and a mass airflow sensor 114 into an air duct 116. The air duct 116 channels air into the air inlet 122 of the compressor 120 of a turbocharger 118. Air is then channeled from the air outlet 124 of the compressor 120 to the air inlet 128 of a first charge air cooler 126. The air outlet 130 of the first charge air cooler 126 is connected to the air inlet 136 of a supercharger 134. A first charge air cooler bypass valve 132 is connected between the air inlet 128 and the air outlet 130 of the first charge air cooler 126 to controllably divert air around the first charge air cooler 126.

Continuing to refer to FIG. 2, air at the air outlet 130 of the first charge air cooler 126 is channeled to the air inlet 136 of a supercharger 134, which is driven by the engine 12 through a controllable clutch 140. The air from the air outlet 138 of the supercharger 134 is channeled to a first port 146 of a second charge air cooler bypass valve 144. The second charge air cooler bypass valve 144 in FIG. 2 allows air entering the first port 146 to be controllably channeled to the second port 148, to the third port 150, or to be blended to both the second port 148 and to the third port 150. Air that is channeled through the second port 148 of the second charge air cooler bypass valve 144 enters an air inlet port 154 of a second charge air cooler 152, through which the air passes by way of an air outlet port 156 of the second charge air cooler 152 to the charge air intake port 158 of the engine 12. Air that is channeled through the third port 150 of the second charge air cooler bypass valve 144 passes directly to the charge air intake port 158 of the engine 12 without passing through the second charge air cooler 152. An air intake heater 80 is configured to heat air at the intake port of a cylinder of the engine 12.

Still with reference to FIG. 2, engine exhaust gas exits an exhaust port 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 42, to be reintroduced into the intake air stream at air duct 116. The remainder of the exhaust gas that is not recirculated through the EGR system passes through a backpressure valve 168, and a muffler 172, to be exhausted out a tail pipe.

Figure 3:
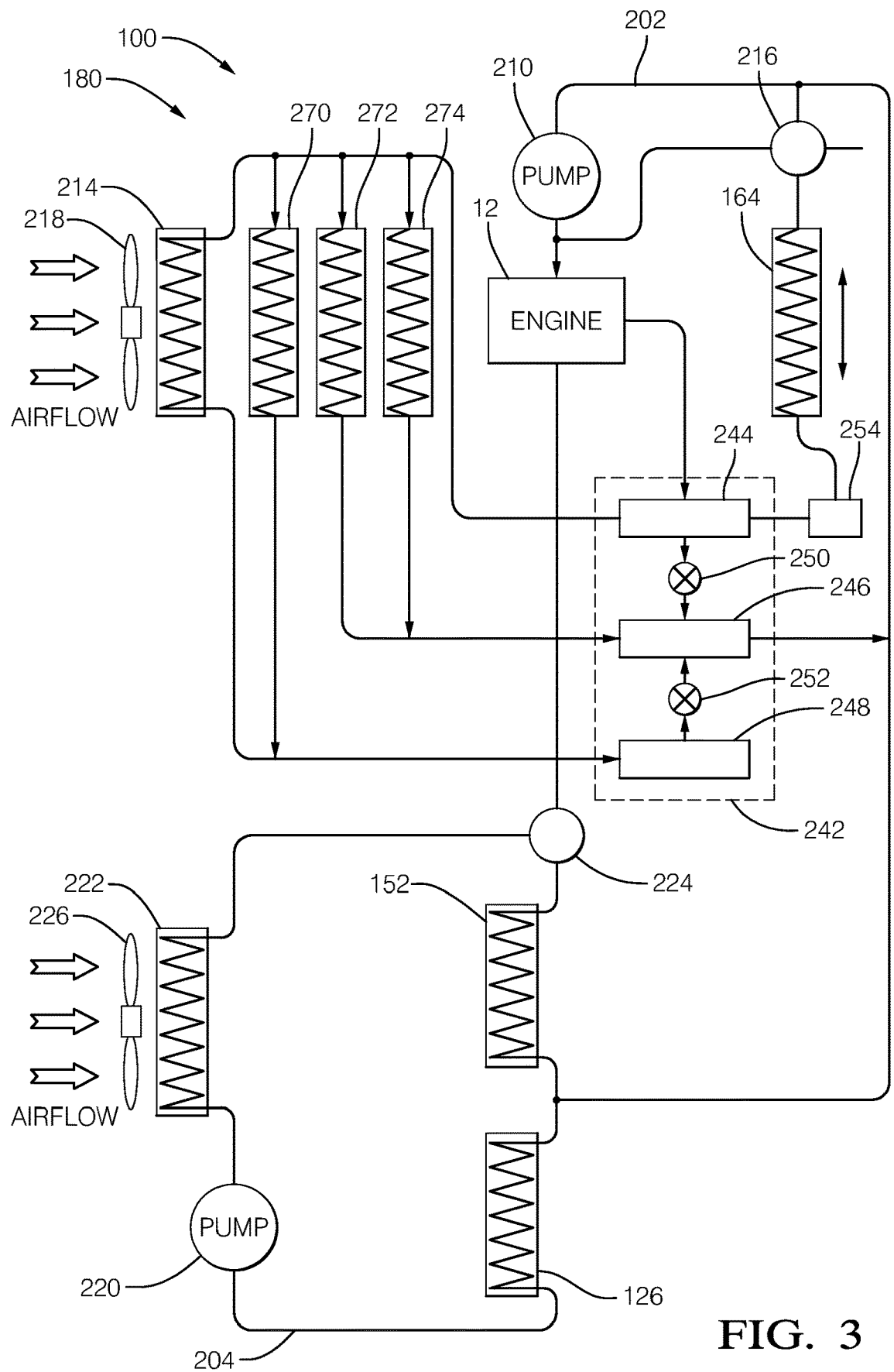
FIG. 3 is a block diagram of an embodiment of the coolant paths of an engine system.

It will be appreciated from the foregoing description of FIG. 2 that the focus of FIG. 2 is on the transport and conditioning of gas constituents, i.e. air into the engine 12 and exhaust gas out of the engine 12. Some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat from the gas to another medium. In the embodiment of FIGS. 2 and 3, the other heat transfer medium is a liquid coolant, discussed in further detail in relation to FIG. 3. In an alternate embodiment, a gaseous coolant may be used in lieu of a liquid coolant.

FIG. 3 depicts an embodiment of coolant paths 180 of the system 100 for conditioning intake air into an engine 12. FIG. 3 includes several components such as the engine 12, the first charge air cooler 126, the second charge air cooler 152, and the EGR cooler 164 that were previously discussed with respect to their functions in the gas paths 190 of the system 100 depicted in FIG. 2. The coolant system 180 may further include an oil cooler 270, a heat exchanger 272 to provide cooling for the turbocharger 122 and a heater core 274, a temperature sensing device, a pressure sensing device, and/or other components not shown in FIG. 2.

Referring to FIG. 3, the coolant paths 180 of the system 100 for conditioning intake air includes a first coolant loop 202. The first coolant loop 202 includes a first coolant pump 210 configured to urge liquid coolant through coolant passages in the engine 12 and through a first radiator 214. The first coolant pump 210 may conveniently be a mechanical pump driven by rotation of the engine 12. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 3, the coolant paths 180 of the system 100 includes a thermostat crossover assembly 242 within which is defined a first chamber 244, a second chamber 246, and a third chamber 248. A first thermostat 250 allows fluid communication between the first chamber 244 and the second chamber 246 when the temperature of the coolant at the first thermostat 250 is within a first predetermined range. A second thermostat 252 allows fluid communication between the third chamber 248 and the second chamber 246 when the temperature of the coolant at the second thermostat 252 is within a second predetermined range. It will be appreciated that, while the first chamber 244, the second chamber 246, the third chamber 248, the first thermostat 250, and the second thermostat 252 are depicted as housed in a common enclosure, these components may be otherwise distributed within the system 180 without departing from the inventive concept.

The embodiment depicted in FIG. 3 further includes the EGR cooler 164, one coolant port of which is connected to a four-way coolant valve 216. The other coolant port of EGR cooler 164 is fluidly coupled to the first chamber 244 through an orifice 254.

Continuing to refer to FIG. 3, the coolant paths 180 of the system 100 further includes a second coolant loop 204. The second coolant loop 204 includes a second coolant pump 220 configured to urge liquid coolant through a second radiator 222, the second charge air cooler 152, a three-way coolant valve 224, and the first charge air cooler 126. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept.

Alternately, the second radiator 222 may be positioned in line with the first radiator 214 such that the first air supply means 218 urges air over both the second radiator 222 and the first radiator 214, in which case the second air supply means 226 would not be required.

Coolant communication between the first coolant loop 202 and the second coolant loop 204 is enabled by the three-way coolant valve 224 and a conduit 240. Control of the four-way coolant valve 216 and the three-way coolant valve 224 may be employed to achieve desired temperature conditioning of intake air. Operation of a similar system is disclosed in U.S. patent application Ser. No. 13/469,404 titled "SYSTEM AND METHOD FOR CONDITIONING INTAKE AIR TO AN INTERNAL COMBUSTION ENGINE" filed May 11, 2012, the entire disclosure of which is hereby incorporated herein by reference.

The GDCI combustion process has demonstrated very high thermal efficiency and very low NOx and particulate matter emissions. The GDCI combustion process includes injecting gasoline fuel into the cylinder with appropriate injection timing to create a stratified mixture with varying propensity for autoignition. Heat and pressure from the compression process produces autoignition of the air/fuel mixture in the cylinder with burn duration long enough to keep combustion noise low, but with combustion fast enough to achieve high expansion ratio for all fuel that is burned.

A particular challenge in GDCI combustion is cold starting the engine. Gasoline fuel has characteristics such that it is resistant to autoignition. As a result, the in-cylinder pressure and temperature for gasoline need to be relatively high compared to diesel fuel to achieve compression ignition. In order to achieve robust combustion in a GDCI engine that has not yet warmed up, a cold start strategy and associated hardware are required.

A method for starting a GDCI engine includes cranking the engine 12. Engine cranking may be achieved by conventional means, such a starter motor or a belt-alternator-starter (BAS) system.

The method for starting the GDCI engine 12 further includes conditioning the intake air provided at the intake port of the cylinder to raise the temperature of the air in the cylinder. Conditioning the intake air may be achieved by providing supplemental heat, for example by using an electric heater 80 disposed in an intake manifold of the engine. Advantageously, the electric heater 80 may be energized to preheat the heater 80 prior to cranking the engine 12 when the controller 20 determines that a cold start may occur soon. For example, a signal indicating a vehicle door unlocking, opening, or closing, or a signal indicating the presence of an occupant in the vehicle driver seat, may trigger preheating the electric heater 80.

Advantageously, in a multiple cylinder engine, each of the cylinders 64 may be provided with an individual heater 80, with each heater 80 individually controllable to provide an appropriate amount of heat to the intake air to its corresponding cylinder 64. By way of non-limiting example, a four cylinder engine may be equipped with four individual heaters 80, with the heaters 80 configured so that each heater 80 heats intake air to one of the four engine cylinders 64. Mounting means for the heaters 80 is advantageously provided downstream of the charge air cooler 152 and upstream of the intake port of the cylinder 64. Combustion quality may be monitored in each individual cylinder 64, for example by combustion detection means 24. Each individual heater 80 may be controlled based on the combustion quality in its corresponding cylinder 64. Control of each heater 80 may be achieved, for example, by using solid state relays (not shown) to control current through each heater 80. The heat delivered by each heater 80 may be controlled, for example, by pulse width modulation of the current through the heater 80.

Application of electrical power to each heater 80 may advantageously be controlled based on various times and/or events within the cold start event. For example, the power applied to the heater 80 while preheating the heater 80 may be controlled to provide a controlled ramp-up to achieve rapid heating while avoiding thermal shock. Application of power to the heater 80 may be suspended for a time interval corresponding to the maximum current draw of the cranking means in order to allow more rapid increase in engine rotational speed. Electrical power to the heater 80 may be controlled to achieve a predetermined temperature of the heater 80, or alternatively to achieve a predetermined intake air temperature to the cylinder 64.

For extremely cold ambient conditions, the heaters 80 may be powered by an energy source external to the engine/vehicle system, for example by electricity provided by an electric utility. Application of electrical power to the heaters 80 may be at a constant rate as long as the external power is available, scheduled at a predetermined duty cycle, or controlled to achieve a predetermined temperature of the heater 80 or a predetermined air temperature at the intake port of a cylinder 64.

It is known that all cylinders of a multi-cylinder internal combustion engine do not operate at precisely the same conditions. Sources of variability may include variation in compression ratio due, for example, to geometric differences, leakage, or deposits within a combustion chamber 28. Other sources of variability may include differences in fuel delivery due to tolerances associated with the fuel injector 30, cylinder-to-cylinder temperature differences, and the like. For GDCI cold starts using a plurality of intake air heaters 80 to condition intake air to the combustion chambers 28, part-to-part variability between individual heaters 80 may contribute to further cylinder-to-cylinder variability. In an embodiment of the present invention, the control parameters associated with each individual heater 80 that produce the desired combustion characteristics, as described above, may be retained in non-volatile memory, for example in the controller 20. These "learned" values may then be used as initial values in determining heater control parameters to be used to control that individual heater 80 during a subsequent cold start event.

Additionally or alternatively, the engine supercharger 134 may be engaged to compress air provided to the cylinder 64, with the compression process contributing heat to the air. Simulation was performed to evaluate the effectiveness of using the supercharger 134 to preheat the air to achieve a temperature of 800 degrees K in the cylinder after compression and before initiation of combustion. Over a range of ambient temperatures ranging from −25° C. to +25° C., the simulation results indicate that using the supercharger 134 to boost the temperature and pressure of the intake air stream results in a reduction of approximately 70 watts per engine cylinder 64 in electrical power required to be provided by the electric heater 80, at any ambient temperature.

In an embodiment of the method of the invention, the supercharger clutch 140 may be engaged throughout the duration of the cranking of the engine 12. In an alternative embodiment, engagement of the supercharger clutch may be delayed, for example for a predetermined time after initiation of cranking or until engine cranking has achieved a predetermined engine speed.

The method for starting the GDCI engine 12 further includes injecting fuel into the cylinder when the air within the cylinder has been heated to a temperature sufficient to support compression ignition of the gasoline and air mixture within the cylinder 64. Determination of when the air has been sufficiently heated may be based on a time duration, wherein the time duration is based on ambient temperature and/or on a temperature measured at the engine 12. A non-limiting example of a temperature measured at the engine 12 is a coolant temperature measurement.

In an embodiment of the invention, if the engine is equipped with a second charge air cooler bypass valve 144, the second charge air cooler bypass valve 144 is controlled so that the air exiting the supercharger 134 bypasses the second charge air cooler 152, to prevent cooling of the supercharger flow during an engine cold start.

In an embodiment of the invention, the first coolant pump 210 is controlled so as not to circulate coolant to cool the cylinder 64 during an engine cold start.

In an embodiment of the invention, the second coolant pump 220 and/or the three-way valve 224 is controlled so as not to circulate coolant to cool the second charge air cooler 152 during an engine cold start.

In an embodiment of the invention, fuel pressure in the fuel supply line that feeds the injector 30 is measured, with the fuel pressure required to reach a predetermined threshold value before fuel is first injected into the cylinder. The threshold value may be based on ambient temperature and/or on a temperature measured at the engine 12.

In an embodiment of the invention, timing of the intake valve 62A and/or the exhaust valve 62B is controlled to effectively eliminate compression of the air in the cylinder 64 when engine cranking is initially commenced, to reduce the load on the starter and allow more rapid increase of engine speed during cranking. Valve timing of the intake valve 62A and the exhaust valve 62B may then be controlled to achieve a maximum effective compression ratio for the engine 12 to provide the highest compression heating before initiation of fuel injection.

In an embodiment of the invention, the backpressure control valve 168 and/or a variable geometry turbocharger 118 are used to increase exhaust backpressure after combustion is initially achieved within the cylinder 64. Timing of the exhaust valve 62B can then be controlled to increase exhaust rebreathing into the cylinder 64 to increase temperature of the air/fuel charge in the cylinder 64 and promote robust autoignition for subsequent engine cycles.

In a further aspect of the invention, a system is provided for starting a GDCI engine. The system includes means for performing the steps of the method as described above. The system also includes a controller configured to control engine control hardware to perform the steps of the method as described above.

While this invention has been described in terms of preferred embodiments thereof, it is not intended to be so limited, but rather only to the extent set forth in the claims that follow.

We claim:

1. A method for starting a compression ignition engine, the engine having at least one cylinder with a reciprocating piston located therein, an intake valve configured to control the intake of air to an intake port of the cylinder, an exhaust valve configured to control the expulsion of gas from an exhaust port of the cylinder, and a charge air cooler configured to transfer heat from the intake air to a coolant and a charge air cooler bypass valve configured to controllably route the intake air through the charge air cooler; the method comprising the steps of:
- cranking the engine;
- conditioning intake air provided at the intake port of the cylinder to raise the temperature of air in the cylinder;
- controlling a valve timing of at least one of the intake valve and the exhaust valve to allow the piston to compress the air within the cylinder to a pressure above the pressure of the intake air provided at the intake port of the cylinder, thereby increasing the temperature of the air within the cylinder;
- injecting fuel into the cylinder when the air within the cylinder has been heated to a temperature sufficient to support compression ignition of a gasoline and air mixture within the cylinder; and
- controlling the charge air cooler bypass valve to control flow of the intake air through the charge air cooler so as to inhibit cooling the intake air while the engine is being started.

2. The method of claim 1 additionally comprising inhibiting coolant flow through the charge air cooler so as to inhibit cooling the intake air while the engine is being started.

3. The method of claim 1, wherein exhaust gases from the engine are routed through an engine exhaust system, the exhaust system comprising a backpressure control means, the method further comprising controlling the backpressure control means to increase exhaust backpressure to a level higher than the pressure of the intake air at the intake port of the cylinder to promote rebreathing of engine exhaust after combustion is initially achieved within the cylinder.

4. The method of claim 1, wherein the engine additionally comprises a system configured to route a coolant through the engine to transfer heat from the at least one cylinder to the coolant, the method additionally comprising controlling coolant flow through the engine so as to inhibit cooling the cylinder while the engine is being started.

5. The method of claim 1, wherein the engine further comprises a heater configured to heat air at the intake port of the cylinder, and the step of conditioning intake air comprises controlling the heater to preheat intake air to the cylinder during a cold start event.

6. The method of claim 5, wherein the heater is controlled so as to preheat intake air to the cylinder prior to cranking the engine during the cold start event.

7. The method of claim 5, wherein the engine comprises a plurality of cylinders each configured with a corresponding individual heater configured to heat air at its intake port, and wherein each of the plurality of heaters is independently controllable.

8. The method of claim 7, wherein combustion in each cylinder is monitored, and each individual heater is controlled based on the combustion in its corresponding cylinder.

9. The method of claim 8, wherein a heater control parameter associated with combustion in the corresponding cylinder is retained in memory in a controller and used as a basis for controlling the corresponding heater in a subsequent cold start event.

10. The method of claim 5, wherein the heater is controlled such that power is not applied to the heater during a time interval corresponding to a maximum current draw of a means used to crank the engine.

11. The method of claim 5, wherein the heater is controlled to achieve a predetermined temperature of the air at the intake port of the cylinder.

12. The method of claim 5, wherein the heater is configured to accept electrical power from an energy source external to a vehicle on which the engine is mounted.

13. A system for starting a compression ignition engine, the engine having at least one cylinder with a reciprocating piston located therein, an intake valve configured to control the intake of air to an intake port of the cylinder and an exhaust valve configured to control the expulsion of gas from an exhaust port of the cylinder; the system comprising;
- means for cranking the engine;
- means for increasing the temperature of intake air provided at the intake port of the cylinder;
- valve timing means to control the opening and closing of at least one of the intake valve and the exhaust valve;
- means for injecting fuel into the cylinder;
- a charge air cooler configured to transfer heat from the intake air to a coolant;
- a charge air cooler bypass valve configured to controllably route the intake air through the charge air cooler; and
- a controller configured to:
- crank said engine with said means for cranking the engine;
- condition, with said means for increasing the temperature of intake air provided at the intake port of the cylinder, intake air provided at the intake port of the cylinder to raise the temperature of air in the cylinder;
- control, with said valve timing means, a valve timing of at least one of the intake valve and the exhaust valve to compress the air within the cylinder to a pressure above the pressure of the intake air provided at the intake port of the cylinder, thereby increasing the temperature of the air within the cylinder;
- inject fuel, with said means for injecting fuel, into the cylinder when the air within the cylinder has been heated to a temperature sufficient to support compression ignition of a gasoline and air mixture within the cylinder; and
- control the charge air cooler bypass valve to control flow of the intake air through the charge air cooler so as to inhibit cooling the intake air while the engine is being started.

14. The system of claim 13 additionally including an engine exhaust system, the exhaust system comprising a backpressure control means, the controller additionally configured to control the backpressure control means to increase exhaust backpressure to a level higher than the pressure of the intake air at the intake port of the cylinder to promote rebreathing of engine exhaust after combustion is initially achieved within the cylinder.

15. The system of claim 13 wherein the engine additionally comprises a system configured to route a coolant through the engine to transfer heat from the at least one cylinder to the coolant, the controller additionally configured to control coolant flow through the engine so as to inhibit cooling the cylinder while the engine is being started.

16. The system of claim 13, wherein the engine further comprises a heater configured to heat air at the intake port of the cylinder, the controller additionally configured to control the heater to preheat intake air to the cylinder during a cold start event.

17. The system of claim 16, wherein the engine comprises a plurality of cylinders each configured with an individual heater configured to heat air at its intake port, and wherein each of the plurality of heaters is independently controllable.

18. The method of claim 1, wherein controlling the charge air cooler bypass valve to control flow of the intake air through the charge air cooler so as to inhibit cooling the intake air while the engine is being started includes the charge air cooler bypass valve directing a portion of the intake air to the intake valve without the portion of the intake air passing through the charge air cooler.

19. The system of claim 13, wherein the controller being configured to control the charge air cooler bypass valve to control flow of the intake air through the charge air cooler so as to inhibit cooling the intake air while the engine is being started includes being configured to control the charge air cooler bypass valve to direct a portion of the intake air to the intake valve without the portion of the intake air passing through the charge air cooler.

* * * * *